United States Patent

Lackey et al.

Patent Number: 5,607,340
Date of Patent: Mar. 4, 1997

[54] ROW TOOL

[76] Inventors: Stanley A. Lackey; Gordon Grosslight, both of 5144 Commerce Ave. #A, Moorpark, Calif. 93021

[21] Appl. No.: 467,074

[22] Filed: Jun. 6, 1995

[51] Int. Cl.$^6$ .................................................. B24B 49/00
[52] U.S. Cl. .................. 451/5; 451/11; 451/405; 29/603.16
[58] Field of Search ................. 451/1, 5, 11, 55, 451/387, 405; 29/603.16

[56] References Cited

U.S. PATENT DOCUMENTS

| | | |
|---|---|---|
| 4,914,868 | 4/1990 | Church et al. |
| 5,117,589 | 6/1992 | Bischoff et al. |
| 5,203,119 | 4/1993 | Cole .................................... 451/5 |
| 5,386,666 | 2/1995 | Cole .................................... 451/5 |
| 5,525,091 | 6/1996 | Lam et al. ........................... 451/5 |

Primary Examiner—Willis Little
Assistant Examiner—Eileen P. Morgan
Attorney, Agent, or Firm—Roger A. Marrs

[57] ABSTRACT

An adjustable row or transfer tool is disclosed herein compensating for row bow or distortion during a lapping process on a surface so as to establish uniform and substantially precise throat heights for a plurality of thin film transducers carried on a row of magnetic head sliders. To provide for adjustment, the body of the row tool is a double series of relief slots provided in an edge marginal region immediately adjacent to the surface intended to be lapped. The first series includes elongated relief slots disposed between square shaped slots extending across the length of the tool while the second series includes several relief slit openings across the tool length above the first series to terminate in cavities at each end. Bend holes in the tool body are located between the first and second series of relief slots and slits. Adjustment may be achieved by mounting the row tool to a closed loop lapping system.

10 Claims, 2 Drawing Sheets

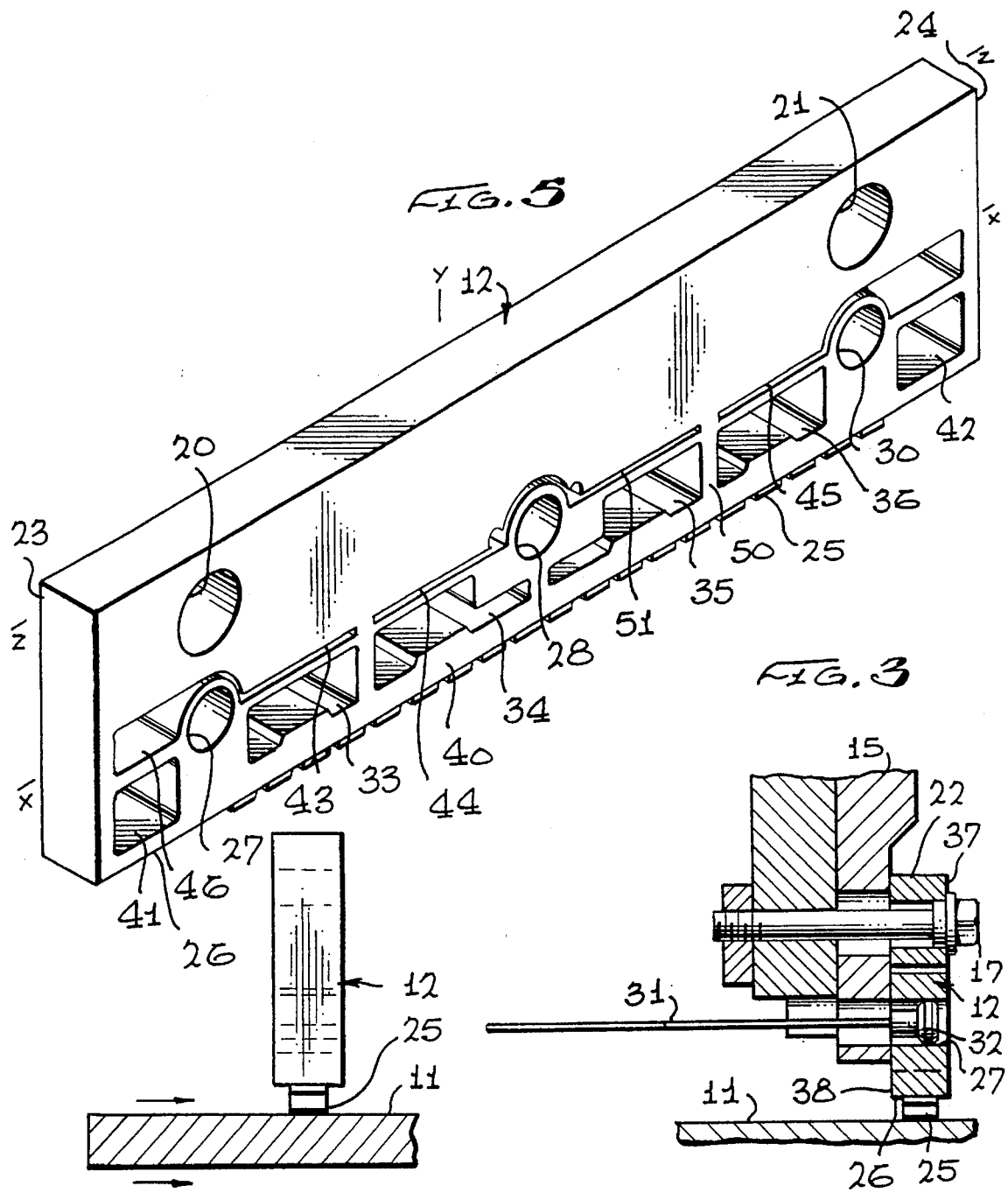

ROW TOOL

BACKGROUND OF THE INVENTION

1. Field of the Invention

The present invention relates to the field of adjustable row or transfer tools, and more particularly to a novel row tool having specially located relief slots and slits permitting adequate strength of the row tool while minimizing undesirable deflection of a surface intended to be made level during a lapping procedure.

2. Description of the Prior Art

Magnetic heads are used extensively in data processing systems, such as disk drives. During head production, batch fabrication is employed whereby a multiplicity of transducers are deposited in a row on a tool or bar composed of ceramic, steel or the like for lapping, polishing and processing simultaneously. The tool or bar serves as a support or substrate for the row of transducers and subsequently is divided into head slider elements. During the manufacture of magnetic heads or head sliders with thin film transducers, the pole tips at which the transducing gap is disposed are ground and lapped to achieve a desired throat height at which optimum data signal processing can be realized. The throat height of all the transducers made during a production run for use with a data storage product must be maintained within a defined limited tolerance.

A problem that exists during the lapping process is row bow, which is a condition wherein the ceramic bar is stressed and assumes an undesirable curvature. As a result, the transducer pole tips that encompass the transducing gap are differently aligned relative to the grinding or lapping plate and, therefore, are lapped at different rates. This condition results in different throat heights for the transducers disposed along the bar or row tool. Prior art adjustment techniques to compensate for row tool bow, balance and to minimize undesirable deflection of a surface to be made level are time-consuming, subject to operator error, cannot accurately correct for row bow and do not afford optimum production yield.

Prior attempts to correct for ceramic bar or slider bar distortion are disclosed in U.S. Pat. Nos. 5,117,589 and 5,203,119. However, problems have been encountered, which stem from the use of a mechanical plunger operable in response to sensed transducer signals to apply pressure to critical locations on the row tool carrying the slider bar. Movement of the plunger and transfer of the loads from the plunger to the row tool are notalways accurate enough to achieve desired bending moments in the row tool. Also, no provision is made in prior devices to adjust for balance or tilt of the row tool prior to the lapping procedure. Furthermore, the open cavities or slots in the body of prior transfer or row tools are so large and randomly placed on the tool that the strength of the tool is compromised resulting in material fatigue and early replacement.

Therefore, a long-standing need has existed to provide an adjustable row tool which includes precisely located stress relief openings without compromising strength or flexibility while being dynamically adjusted during a lapping or grinding procedure.

SUMMARY OF THE INVENTION

Accordingly, the above problems and difficulties are avoided by the present invention which provides a novel adjustable row tool which includes an, elongated tool body composed of steel or ceramic, and which includes a pair of mounting holes adjacent to the top of the body for attachment to a closed lapping system. Midway across the length of the row tool body, there are provided several bend holes which are adaptable to interface with force rods actuated by the lapping system to provide for load forces to the row tool. A plurality of electromagnetic heads or the like are carried on a slider attached to the bottom of the row tool while a first and second series of relief openings and cavities are provided in line with the bend holes and residing immediately adjacent to the bottom of the row tool adjacent the magnetic heads intended to be levelled.

In one form of the invention, the first series of relief openings takes the form of several elongated open cavities residing immediately adjacent to the bottom section of the row tool with the second row of relief openings taking the form of aligned slits which are strategically located between the longitudinal center line of the tool and its bend holes or first series of relief openings. Additionally, square and longitudinal openings are provided at the respective ends of each of the series of slits and slots. Vertical and horizontal webs separating the slits and slots provide sufficient strength to restrain lower bending surface from twisting due to lapping and bending or other forces than the desired linear forces.

Therefore, it is among the primary objects of the present invention to provide novel adjustable row tool which may be readily adjusted to prevent row tool bow from adversely affecting the levelling of a row of electronic elements intended to be lapped.

Another object of the present invention is to provide a novel adjustable row tool having a plurality of openings taking the form of slits and slots which serve as relief openings so as to conduct load forces derived from bending loads into supporting structure without distortion of the row tool itself.

Another object of the present invention is to provide a novel adjustable row tool for lapping magnetic head sliders which includes openings for securing the tool to a lapping apparatus and which further includes openings for receiving bending rods associated with the lapping apparatus and which further includes a first and second series of relief openings taking the form of slots and slits whereby sufficient material remains to avoid material fatigue during bending procedures.

BRIEF DESCRIPTION OF THE DRAWINGS

The features of the present invention which are believed to be novel are set forth with particularity in the appended claims. The present invention, both as to its organization land manner of operation, together with further objects and advantages thereof, may best be understood with reference to the following description, taken in connection with the accompanying drawings in which:

FIG. 3 is an enlarged transverse cross-section of the adjustable row tool carried on the supports of the lapping system as taken in the direction of arrows 3—3 of FIG. 2;

FIG. 4 is a bottom view of the adjustable row tool of the present invention as taken in the direction of arrows 4—4 of FIG. 2;

FIG. 5 is a front perspective view of the novel adjustable row tool showing bending axes; and FIG. 6 is a schematic view illustrating a lapping procedure employing the adjustable row tool of the present invention.

DESCRIPTION OF THE PREFERRED EMBODIMENT

A closed loop lapping system is indicated in the general direction of arrow 10 which includes a revolving lapping table 11 having a grinding surface for contacting and lapping a plurality of electronic heads carried on the underside of a transfer or row tool 12. The transfer or row tool 12 is secured to the ends of downwardly depending support struts 13 and 15 by means of bolts passing through mounting holes. The row tool 12 is adjusted for balance and bow by means of bend rods (not shown) which are positioned within bend-holes on the row tool 12. The bend rods are under control of the closed loop lapping system which includes an arm 16 and which is more fully disclosed and described in co-pending application Ser. No. 08-379,791 having a filing date of Jan. 27, 1995.

Figure 1:
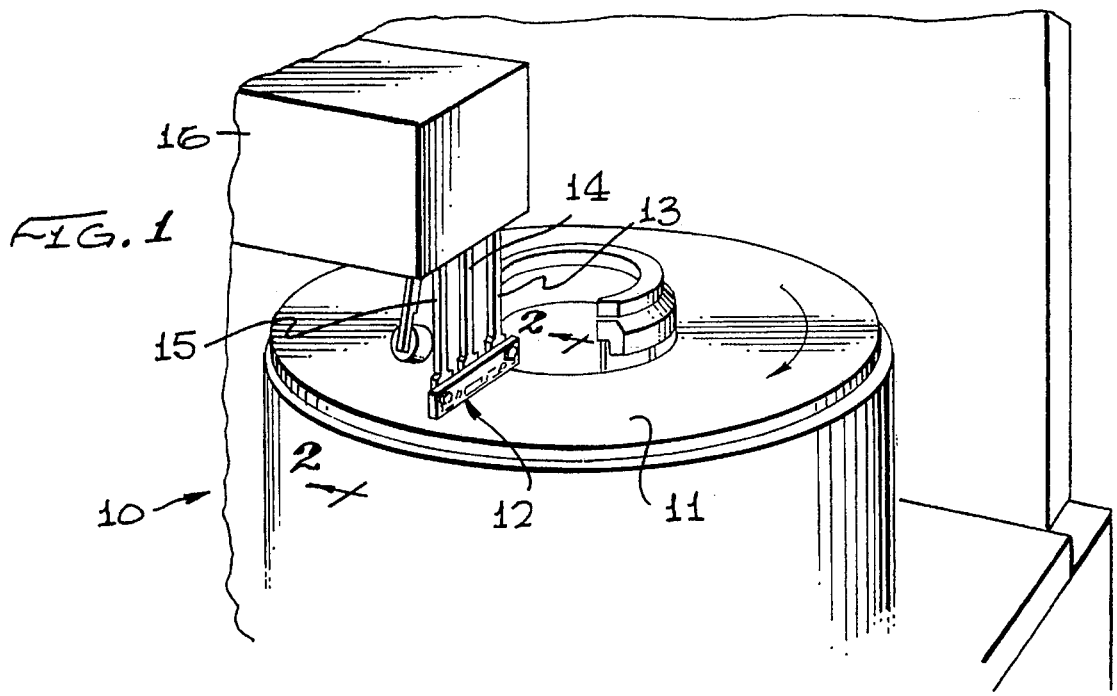
FIG. 1 is a diagrammatic drawing of a lapping machine for supporting, and lapping the novel adjustable row tool incorporating the present invention.
Figure 2:
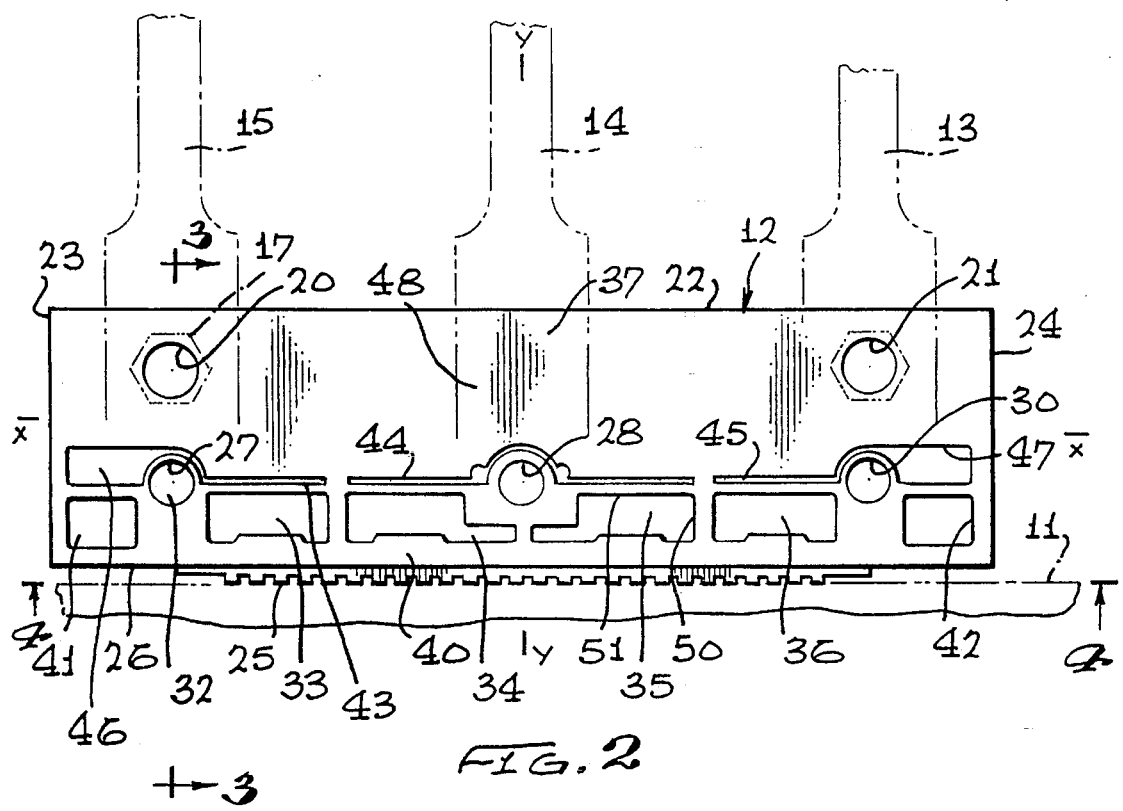
FIG. 2 is an enlarged front elevational view of the novel adjustable row tool used in the lapping system shown in FIG. 1

Relating now in detail to FIGS. 2 and 3, it can be seen that the bolts, as indicated by numeral 17, retain the row tool 12 onto the ends of the struts, such as strut 15, in fixed position. The bolts pass through a pair of mounting holes 20 and 21 which are in horizontal alignment and which are formed through the thickness of the row tool adjacent to the top surface 22 of the tool. The mounting holes are arranged in fixed spaced-apart relationship and each of the pair of holes are located in close proximity to the opposite sides of the tool represented by numerals 23 and 24. The underside or bottom of the row tool supports a row of electrical heads and is indicated by numeral 25. The row of heads may be carried on a slider which is adhesively attached to the bottom surface, indicated by numeral 26.

The row tool 12 is further provided with bend holes 27, 28 and 30 respectively. Bend rods from the lapping apparatus 10 are insertably received through the respective holes and such a bend rod is identified by numeral 31 in FIG. 3 with its tip 32 inserted through bend hole 27.

FIG. 2 also illustrates a plurality of relief openings taking the form of a first series of slots identified by numerals 33, 34, 35 and 36. It is to be noted that each of these respective slots are elongated so that their length is longer than their height. Also, it is to be understood that all of the relief slots are opened from the front and rear sides of the tool. The front side carries numeral 37 while the back side carries numeral 38. The first series of relief holes are located in close proximity to the bottom surface 26 and the row of heads 25. A first section of row tool material separates the relief openings 33–36 inclusive from the row of heads 25 and is indicated by numeral 40. At the opposite ends of the first series of relief openings, there are provided additional relief openings taking the form of square configured opening 41 associated with one end of the first series and opening 42 associated with the other end of the first series of relief openings. Immediately above and adjacent to the first series of relief openings, there is provided a second series of relief openings taking the form of slits 43, 44 and 45. The second series of relief slits terminates at its opposite ends in enlarged cavities or openings 46 and 47 respectively. It is to be noted that the first and second series of relief openings are all provided on the same half of the row tool below the central longitudinal axis, identified by X—X. The material or section of material separating the second row of relief openings and slits from the top surface 22 is identified by numeral 48.

To further describe the adjustable row tool, it is noted that webs of material exist between and separate all of the relief openings in both a vertical and horizontal direction. As an example, reference numeral 50 indicates a web of material separating relief slots 35 and 36 while numeral 51 indicates row tool material separating slot 35 in the first series from slit 44 in the second series. A Y—Y axis is indicated as passing through the center of the row tool 12 midway between its opposite ends.

FIG. 4 illustrates a Z—Z axis which passes through the row tool 12 between its front and rear faces along the longitudinal axis thereof.

In FIG. 5, all of the relief openings, slots and slits are illustrated so that it can be seen that such openings and holes are completely through the thickness of the row tool 12 between its front and rear surfaces. It can also be seen that the webs of material as well as the sections of material which separate the first and second series of relief openings and the bend holes and mounting holes are strategically placed to define the respective relief openings and yet permit sufficient material to absorb load forces and to respond to applied loads for correcting row tool distortion.

In FIG. 6, it can be seen that the applied load forces from the lap plate 11 are applied to the row of heads 25 via its grinding surface that comes into contact with the heads. Information electronically generated by the heads which may include transducers is conducted to the closed loop lapping system for correction so that various loads can be applied to the row tool 12 via the bend rods, such as rod 31.

Accordingly, the row tool or transfer tool of the present invention is employed to mount a row of heads 25 to permit the heads to be lapped and to correct for row bow. The row tool is permitted to bend at the three points represented by the three axes Y—Y, X—X and Z—Z to allow for correction of a IVth order row bow. The row tool bends at the three points in the Y—Y axis and the relief openings in the material allow for elasticity so that the material will not overstress itself and lose its shape. The placement of the holes for bending, limit the amount of stretching in the row. The purpose of the row tool is to bend the row of heads during the lapping process when independent forces are applied to the three points and when the lapping process is finished for a given row, anew row can be attached to the row tool. The tool is also intended to be stiff so forces applied on the Y—Y axes at the mounting holes will not cause deformation in the row tool or the row of heads. The purpose of the square end relief openings is to prevent twisting of the tool on the Z—Z axis about the Y—Y axis when external forces are exerted in the Z—Z axis as the lap plate touches the row of heads and when the bend forces in the Y—Y axes are applied off center of the row tool.

While particular embodiments of the present invention have been shown and described, it will be obvious to those skilled in the art that changes and modifications maybe made without departing from this invention in its broader aspects and, therefore, the aim in the appended claims is to cover all such changes and modifications as fall within the true spirit and scope of this invention.

What is claimed is:

1. An adjustable row tool for minimizing deflection and distortion of a row of magnetic heads intended to made level via a lapping procedure comprising:

an elongated member having opposite ends connecting a top section, a middle section and a lower section to provide a unitary construction;

a plurality of stress relief openings provided in said member middle section and said lower section in spaced-apart relationship across said member between said opposite ends;

a pair of mounting holes in said member in alignment with each other across said member top section between said opposite ends; and at least three bend openings in said member arranged in a linear spaced-apart alignment and overlapping said middle and said lower sections for directly applying load forces to said member to correct deflection and distortion for bow in said member.

2. The invention as defined in claim 1 wherein:

said member has a front and rear side defined between said opposite ends;

said relief openings extending through the thickness of said member to open through said front side and said rear side.

3. The invention as defined in claim 2 wherein:

said relief openings in said first series are elongated, rectangular openings terminating at each end of said first series with square openings.

4. The invention as defined in claim 3 wherein:

said square openings in said first series are separated from said adjacent elongated openings by one of said bend holes.

5. The invention as defined in claim 4 wherein:

said second series of relief openings are linear slits in alignment and separated from adjacent ends of said slits in spaced apart relationship and terminating at each end in a rectangular opening adjacent to each of said member opposite ends.

6. The invention as defined in claim 5 wherein:

portions of said member middle section and said lower section defining said relief openings of said first section and said second section constituting webs for conducting load forces applied through said bend holes.

7. A row tool for adjusting bow with respect to a row of heads intended to be made level by locking procedure comprising:

an elongated member having a front face and a rear face defined between opposite ends;

a top section extending between said member opposite ends;

a lower section extending between said opposite ends;

a middle section extending between said opposite ends integrally joining said top section with said lower section;

a pair of spaced apart mounting holes provided in said top section;

at least three bend holes provided at an interface of said middle section with said lower section;

a first series and a second series of pressure relief openings provided in said middle section and said lower section respectively extending through said member opening at said front face and said rear face; and a row of heads carried on said lower section in downwardly depending orientation and having terminating ends positionable along the length of said row in response to applied loads introduced to said member adjacent to said bend holes to adjust the level of said heads in said row.

8. The invention as defined in claim 7 wherein:

said relief openings are elongated rectangular openings in said second series and said relief openings in said first series are linear slits in alignment with and separated by said bend holes.

9. The invention as defined in claim 8 including:

arcuate slits joining adjacent ends of said linear slits about said bend holes.

10. The invention as defined in claim 9 wherein:

said member includes a horizontal axis X—X extending between said opposite ends;

said member includes a vertical axis Z—Z extending between said opposite ends;

said member includes a transverse pivotal axis Y—Y extending vertically midway between said opposite ends; and said bend holes having surrounding member portions conducting load forces to adjust the level of said row about said above mentioned axis.

* * * * *